United States Patent
Yonezawa

(10) Patent No.: US 9,995,603 B2
(45) Date of Patent: Jun. 12, 2018

(54) POSITION DETECTOR, AND LENS APPARATUS AND IMAGE PICKUP APPARATUS INCLUDING THE POSITION DETECTOR

(71) Applicant: CANON KABUSHIKI KAISHA, Tokyo (JP)

(72) Inventor: Takeshi Yonezawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 35 days.

(21) Appl. No.: 14/754,895

(22) Filed: Jun. 30, 2015

(65) Prior Publication Data
US 2016/0003644 A1    Jan. 7, 2016

(30) Foreign Application Priority Data
Jul. 3, 2014   (JP) ................................ 2014-137473

(51) Int. Cl.
   *G01D 5/34*   (2006.01)
   *G01D 5/347*  (2006.01)
   (Continued)

(52) U.S. Cl.
   CPC ........... *G01D 5/34776* (2013.01); *G01D 3/08* (2013.01); *G01D 5/24466* (2013.01); *G01D 5/34715* (2013.01); *G01D 5/34746* (2013.01)

(58) Field of Classification Search
   CPC ..... G01D 5/2446; G01D 5/34776; G01D 3/08
   (Continued)

(56) References Cited

U.S. PATENT DOCUMENTS 6,898,744 B1   5/2005  Jannotta
2011/0266424 A1*  11/2011  Kawatoko .......... G01D 5/24461
                                                     250/229
(Continued)

FOREIGN PATENT DOCUMENTS

EP   2385354 A2   11/2011
EP   2789988 A2   10/2014
(Continued)

OTHER PUBLICATIONS

European Search Report issued in European counterpart application No. EP15001886.9, dated Nov. 9, 2015.

*Primary Examiner* — Thanh Luu
(74) *Attorney, Agent, or Firm* — Rossi, Kimms & McDowell LLP

(57) ABSTRACT

A position detector, including: a scale including a pattern array formed cyclically in a movement direction, the scale being provided to a fixed member or a movable member; a detector including detection elements arranged in the movement direction, the detector being provided to the other; a generating unit that selectively generates, from signals received from the detection elements, a first signal obtained by a first combination of the signals or a second signal obtained by a second combination of the signals; an output unit that outputs the first or second signal received from the generating unit; and a switcher that switches over between the first and second signals as a signal to be generated, wherein the first signal changes within a first range, corresponding to a relative position; and the second signal does not change beyond a second range smaller than the first range, corresponding to the relative position.

14 Claims, 13 Drawing Sheets

(51) Int. Cl.
*G01D 3/08* (2006.01)
*G01D 5/244* (2006.01)

(58) Field of Classification Search
USPC .......................................... 250/231.1–231.19
See application file for complete search history.

(56) References Cited

U.S. PATENT DOCUMENTS

| | | | |
|---|---|---|---|
| 2012/0116717 A1 | 5/2012 | Satou et al. | |
| 2012/0262731 A1* | 10/2012 | Nagura | G01D 5/34746 356/616 |
| 2013/0135612 A1* | 5/2013 | Mutschler | G01C 1/00 356/138 |

FOREIGN PATENT DOCUMENTS

| | | |
|---|---|---|
| JP | 2002039727 A | 2/2002 |
| JP | 2011247879 A | 12/2011 |

* cited by examiner

_(1)_

POSITION DETECTOR, AND LENS APPARATUS AND IMAGE PICKUP APPARATUS INCLUDING THE POSITION DETECTOR

BACKGROUND OF THE INVENTION

Field of the Invention

The present invention relates to a position detector, and more particularly, to an absolute position detector configured to detect an absolute position, and a lens apparatus and image pickup apparatus including the absolute position detector.

Description of the Related Art

Hitherto, there is known a technology for detecting an abnormality such as a scratch or dust in a position detector for measuring a moving distance of an object.

In Japanese Patent Application Laid-Open No. 2002-39727, there is disclosed a technology of a position detector configured to obtain an absolute position by reading a pattern array, the position detector including a sensor that covers an area larger than a pattern reading area, in which a correct position is obtained by shifting an area to be read back and forth so as to read the area when an abnormality occurs in a pattern.

Further, in Japanese Patent Application Laid-Open No. 2011-247879, there is disclosed a technology of a position detector configured to measure the position by using only an area determined not to have an abnormality. The determination as to whether or not an abnormality has occurred is realized by comparing respective periodic signals.

The technology disclosed in Japanese Patent Application Laid-Open No. 2002-39727 can be adapted only to an encoder configured to obtain the absolute position by reading the pattern array, and is not applicable to an incremental type encoder or an encoder configured to obtain the absolute position based on a Vernier type.

In the technology disclosed in Japanese Patent Application Laid-Open No. 2011-247879, in a case of a scratch or dust having the same size as a width of a cycle, an effect of the scratch or dust is exerted on the respective periodic signals to the same degree, which leads to a problem in that an error cannot be detected even by conducting the comparison.

SUMMARY OF THE INVENTION

Therefore, the present invention provides an encoder for measuring a moving distance of an object, which is capable of detecting an error caused by an abnormality such as a scratch or dust, and a position detector, lens apparatus and image pickup apparatus using the encoder.

According to one embodiment of the present invention, there is provided a position detector, including: a scale including a pattern array formed cyclically in a movement direction, the scale being provided to one of a fixed member and a movable member; a detector including a plurality of detection elements arranged in the movement direction, the detector being provided to the other of the fixed member and the movable member; a generating unit that selectively generates, from signals received from the plurality of detection elements, one of a first signal obtained by a first combination of the signals and a second signal obtained by a second combination of the signals; an output unit that outputs the one of the first signal and the second signal received from the generating unit; and a switcher that switches over between the first signal and the second signal as a signal to be generated by the generating unit, in which: the first signal is a signal having a value that changes within a first range, corresponding to a position of the scale relative to the detector; and the second signal is a signal having a value that does not change or changes in a second range smaller than the first range, corresponding to the position of the scale relative to the detector.

According to the one embodiment of the present invention, it is possible to provide the position detector capable of detecting the abnormality such as a scratch or dust, and the lens apparatus and image pickup apparatus using the position detector.

Further features of the present invention will become apparent from the following description of exemplary embodiments with reference to the attached drawings.

DESCRIPTION OF THE EMBODIMENTS

In the following, exemplary embodiments of the present invention are described in detail with reference to the accompanying drawings.

First Embodiment

In the following, a position detector according to a first embodiment of the present invention is described with reference to FIG. 1 to FIG. 9D.

Figure 1:
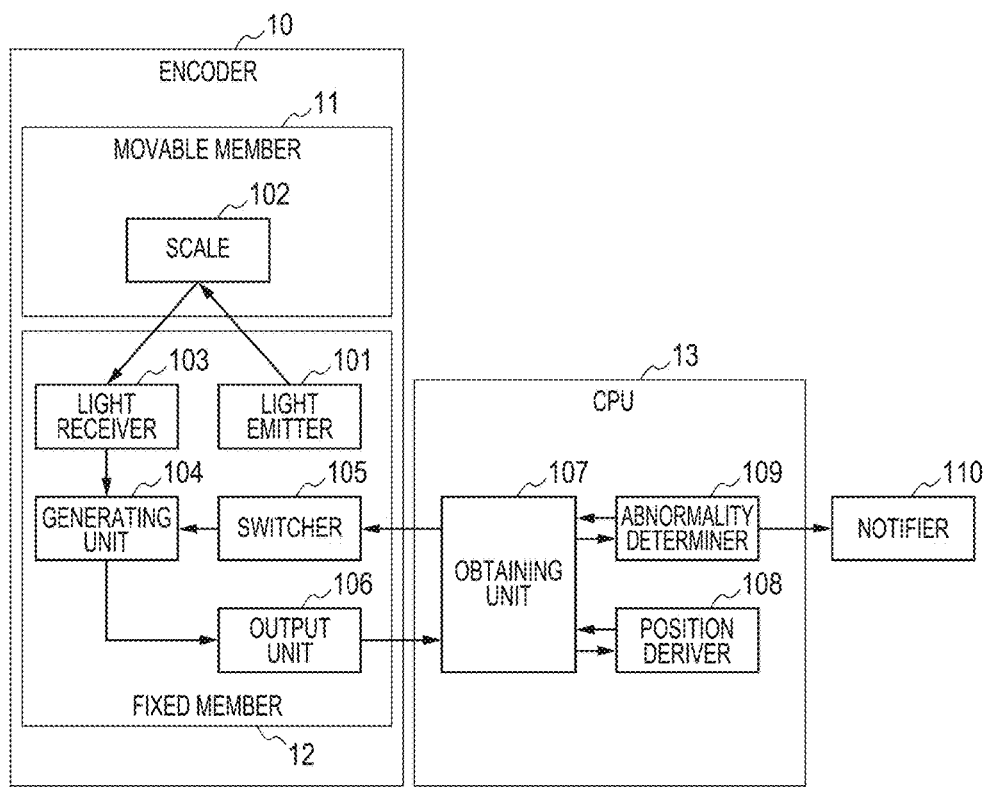
FIG. 1 is a configuration block diagram according to a first embodiment of the present invention.

FIG. 1 is a configuration block diagram of the position detector according to the first embodiment of the present invention. In FIG. 1, a light emitter 101 is a light source formed of an LED or the like, and emits light to a scale 102. The scale 102 reflects the light emitted from the light emitter 101 toward a light receiver 103. In this embodiment, the light emitter 101 and the light receiver 103 construct a detector. The light receiver 103 is an optical sensor configured to convert the light reflected by the scale 102 into an electric signal. Note that, the scale 102 and the light receiver 103 are described later in detail.

A generating unit 104 is a generating unit configured to selectively generate, from signals received from the light receiver 103, a periodic signal corresponding to a position of a movable member or an abnormality detection signal necessary to determine that an abnormality exists in the scale 102 or the light receiver 103.

A switcher 105 is a switcher configured to switch over between the periodic signal and the abnormality detection signal as a signal to be generated by the generating unit 104. The switchover is determined based on a signal received from the outside so as to switch over to output, for example, the periodic signal when 0 V are applied at a terminal and the abnormality detection signal when 3 V are applied.

Note that, the generation of the periodic signal and the generation of the abnormality detection signal conducted by the generating unit 104 and the switcher 105 are described later in detail.

An output unit 106 is an output unit configured to output the signal generated by the generating unit 104. In this embodiment, in the same manner as a normal incremental encoder, the output unit 106 is configured to be able to simultaneously output two signals of phases A and B.

An encoder 10 includes a movable member 11 and a fixed member 12. The movable member 11 includes the scale 102, and the fixed member 12 includes the light emitter 101, the light receiver 103, the generating unit 104, the switcher 105, and the output unit 106.

An obtaining unit 107 is an obtaining unit configured to control the switcher 105 to obtain a desired signal from the output unit 106.

A position deriver 108 is a position deriver configured to derive the position of the movable member 11 based on the signal obtained by the obtaining unit 107. The derivation of the position is the same processing as that of the normal incremental encoder, and hence a description thereof is omitted.

An abnormality determiner 109 is an abnormality determiner configured to determine whether or not an abnormality exists in the encoder 10 based on the signal obtained by the obtaining unit 107. The abnormality determination conducted by the abnormality determiner 109 is described later.

A notifier 110 is a notifier configured to notify an abnormality to the user when the abnormality determiner determines that the abnormality exists. The notifier 110 is, for example, an LED.

Note that, the obtaining unit 107, the position deriver 108, and the abnormality determiner 109 are implemented by, for example, one CPU 13.

First, a detailed configuration of the encoder 10 and generation of the signal are described.

Figure 2:
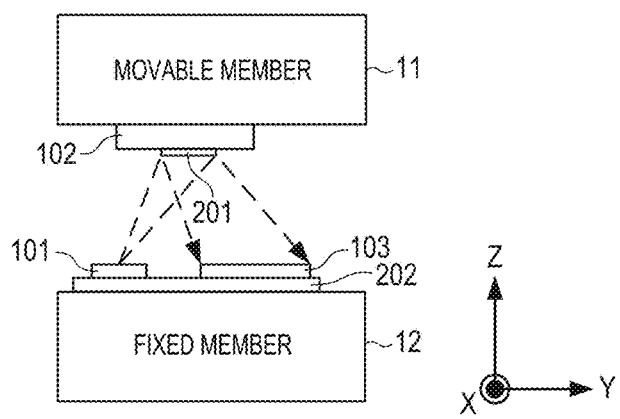
FIG. 2 is a sectional view of a position detector.

FIG. 2 is a sectional view of the encoder 10 according to this embodiment. Note that, components corresponding to those illustrated in the block diagram of FIG. 1 are denoted by the same reference numerals, and descriptions thereof are partially omitted.

In FIG. 2, the movable member 11 is a movable member capable of moving in an X-axis direction perpendicular to the paper surface.

The scale 102 includes a regular-interval track pattern 201. The light receiver 103 is a light receiver for receiving the light that is emitted from the light emitter 101 and reflected by the track pattern 201, and is formed of, for example, a photodiode array. A signal processing circuit 202 includes the generating unit 104, the switcher 105, and the output unit 106. Note that, in this embodiment, the configuration in which the scale 102 is provided to the movable member 11 and the light emitter 101 and the light receiver 103 are provided to the fixed member 12 is exemplified. However, it should be understood that the configuration is not limited thereto. The scale 102 only needs to be provided to one of the fixed member 12 and the movable member 11, whereas the light emitter 101 and the light receiver 103 only need to be provided to another of the fixed member 12 and the movable member 11. The same also applies to an embodiment described later.

Figure 3:
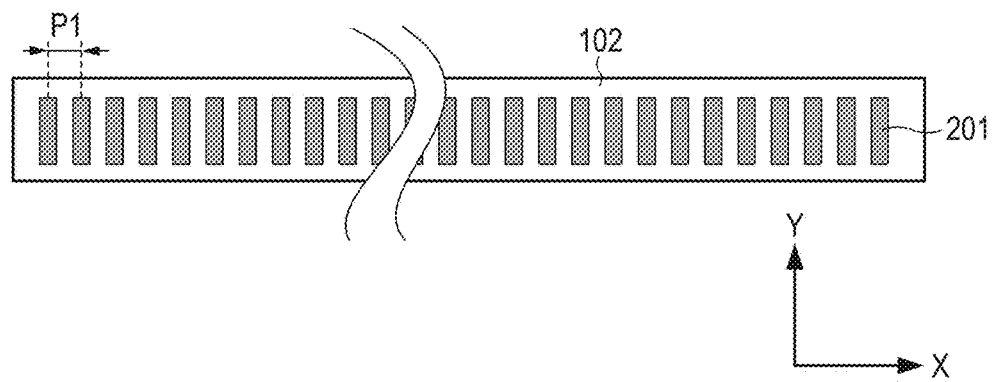
FIG. 3 is a plan view of a scale according to the first embodiment.

FIG. 3 is a plan view of the scale 102 according to the first embodiment. In FIG. 3, a reflective type slit pattern (reflective pattern array, reflective pattern row) is illustrated as an example. The scale 102 includes a track pattern 201. The scale 102 is configured as follows. When the light emitted from the light emitter 101 enters reflective portions (black portions) of the track pattern 201, the light is reflected toward the light receiver 103. The reflective portions of the track pattern 201 are cyclically formed at equal pitches P1 in a movement direction relative to the fixed member. In this embodiment, the pitch P1 is determined so that thirty-nine reflective portions are formed over a total length Lmax of the scale, that is, to have thirty-nine cycles over the total length Lmax.

$$P1 = Lmax/39$$

Figure 4:
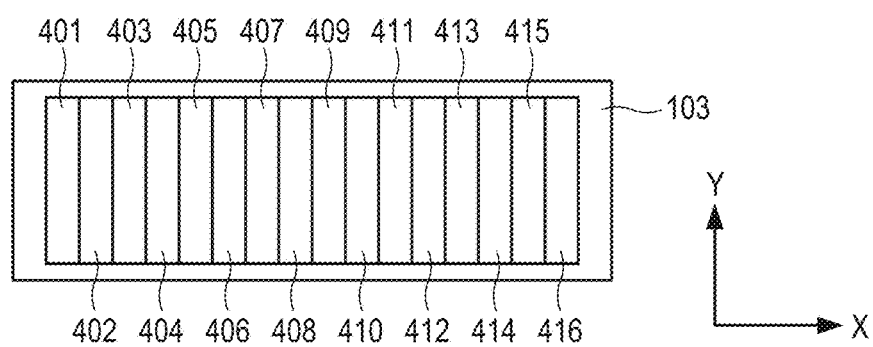
FIG. 4 is a plan view of a light receiver.
Figure 5:
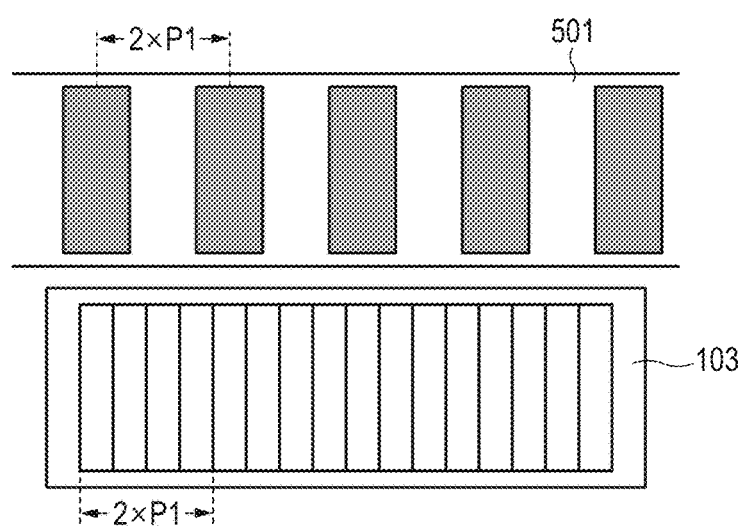
FIG. 5 is a diagram for illustrating a relationship between the light receiver and reflected light.

FIG. 4 is a plan view of the light receiver 103. Sixteen photodiodes 401 to 416 (plurality of detection elements) are arranged on the light receiver 103 at equal pitches in a horizontal direction (direction of arrangement of slit pattern (reflective pattern array, reflective pattern row)). This embodiment is described based on the presupposition that a length for four photodiodes included in the light receiver 103 in a direction of arrangement of the photodiodes (for example, a distance from an end of the photodiode 401 to an end of the photodiode 404) is twice as large as the pitch P1 of the reflective portions of the track pattern 201. An optical path length of light that is emitted from the light emitter 101 and reflected by the reflective portions of the track pattern 201 is a half of an optical path length of light that is emitted from the light emitter 101 to the light receiver 103. Therefore, a width of the reflected light received by the light receiver 103 is twice as large as the width at the reflective portion. FIG. 5 is a diagram for illustrating a relationship between the light receiver 103 and reflected light 501 reflected by the track pattern 201. In this manner, the width for the four photodiodes included in the light receiver 103 in the X direction (direction of arrangement of slit pattern (reflective pattern array, reflective pattern row)) corresponds to one cycle of the pattern of the reflected light 501 reflected by the track pattern 201.

When the light emitted from the light emitter 101 and reflected by the track pattern 201 is received by the light receiver 103, the respective photodiodes 401 to 416 output voltage signals sig01 to sig16 obtained by converting photoelectric currents corresponding to amounts of the received light into a voltage by a current-voltage converter.

The voltage signal sig01 can be expressed by a phase $\theta$ corresponding to the cycle of the track pattern 201 as follows.

$$sig01 = a1 \times \sin \theta + s1$$

In the expression, a1 and s1 represent an amplitude and an offset, respectively.

Then, the voltage signal sig02 can be expressed as follows.

$$sig02 = a1 \times \sin(\theta + (1/2 \times P1/(2 \times P1)) \times (2 \times \pi)) + s1 = a1 \times \cos \theta + s1$$

Similarly, the voltage signals sig03 to sig16 can be expressed as follows.

$$sig03 = a1 \times (-\sin \theta) + s1$$

$$sig04 = a1 \times (-\cos \theta) + s1$$

$$sig05 = a1 \times \sin \theta + s1$$

$$sig06 = a1 \times \cos \theta + s1$$

$$sig07 = a1 \times (-\sin \theta) + s1$$

$$sig08 = a1 \times (-\cos \theta) + s1$$

$$sig09 = a1 \times \sin \theta + s1$$

$$sig10 = a1 \times \cos \theta + s1$$

$$sig11 = a1 \times (-\sin \theta) + s1$$

$$sig12 = a1 \times (-\cos \theta) + s1$$

$$sig13 = a1 \times \sin \theta + s1$$

$$sig14 = a1 \times \cos \theta + s1$$

$$sig15 = a1 \times (-\sin \theta) + s1$$

$$sig16 = a1 \times (-\cos \theta) + s1$$

Next, the generation of the periodic signal (first signal) and the generation of the abnormality detection signal (second signal) that are conducted by the generating unit 104 are described.

Figure 6A:
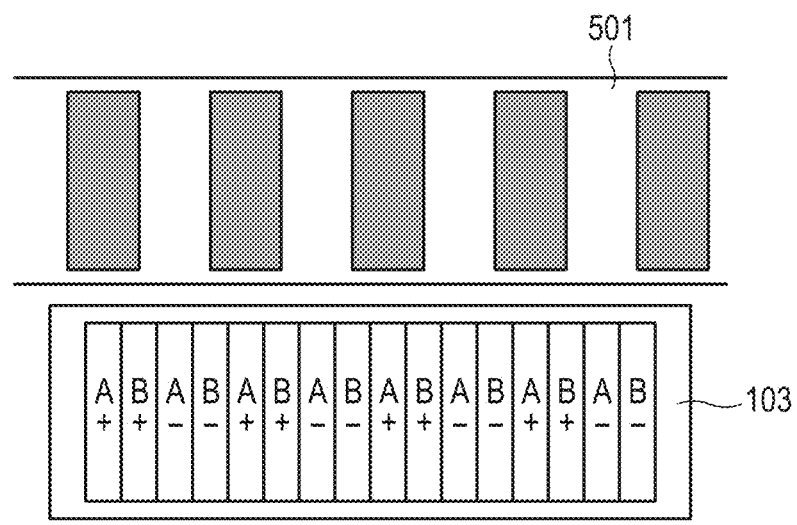
FIG. 6A is a diagram for illustrating a relationship between the reflected light and a method of using a light receiver according to the first embodiment.

When the switchover is made to the generation of the periodic signal by the switcher 105, as illustrated in FIG. 6A, the generating unit 104 generates a periodic signal A1 and a periodic signal B1 from the voltage signals sig01 to sig16 output from the light receiver 103 as expressed by the following expressions.

$$A1 = a2 \times (sig01 - sig03 + sig05 - sig07 + sig09 - sig11 + sig13 - sig15) + s2 = a2 \times (8 \times a1 \times \sin \theta) + s2$$

$$B1 = a2 \times (sig02 - sig04 + sig06 - sig08 + sig10 - sig12 + sig14 - sig16) + s2 = a2 \times (8 \times a1 \times \cos \theta) + s2$$

In the expressions, a2 and s2 represent an amplitude and an offset, respectively. Those values are obtained by designing the periodic signals A1 and B1 so as to fall within a range of from 0 V to 3 V around 1.5 V, and can be expressed by, for example, the following expressions.

$$a2 = 3/(8 \times a1 \times 2)$$

$$s2 = 1.5 \text{ V}$$

Thus, the periodic signals A1 and B1 are generated so that a voltage is amplified for the track pattern 201, and it is possible to generate the periodic signals A1 and B1 of the track pattern 201 whose phase are shifted from each other by 90°.

Next, the generation of the abnormality detection signal conducted by the generating unit 104 is described.

Figure 6B:
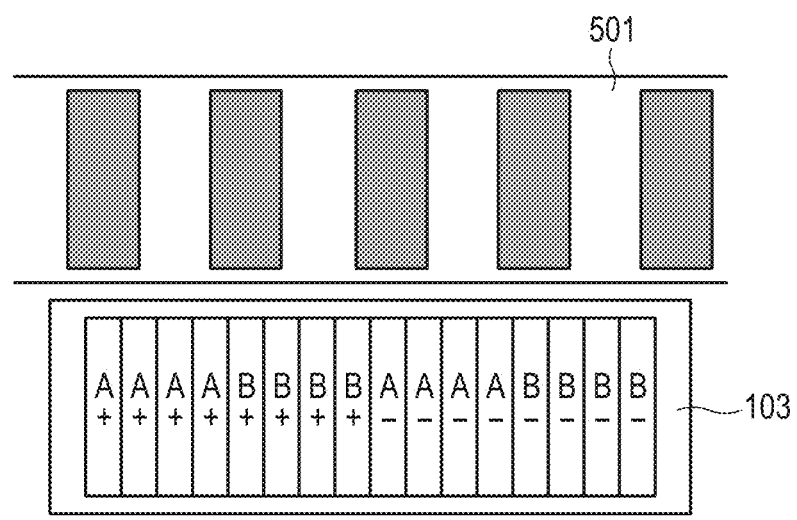
FIG. 6B is a diagram for illustrating a relationship between the reflected light and the method of using the light receiver according to the first embodiment.

When the switchover is made to the generation of the abnormality detection signal by the switcher 105, as illustrated in FIG. 6B, the generating unit 104 generates an abnormality detection signal A2 and an abnormality detection signal B2 from the voltage signals sig01 to sig16 output from the light receiver 103 as expressed by the following expressions.

$$A2 = a2 \times (sig01 + sig02 + sig03 + sig04 - sig09 - sig10 - sig11 - sig12) + s2 = s2$$

$$B2 = a2 \times (sig05 + sig06 + sig07 + sig08 - sig13 - sig14 - sig15 - sig16) + s2 = s2$$

Thus, the abnormality detection signals A2 and B2 can be generated so that voltages cancel each other for the track pattern 201, and it is possible to generate the abnormality detection signals that are contrast with s2 irrespective of the phase $\theta$.

Figure 7A:
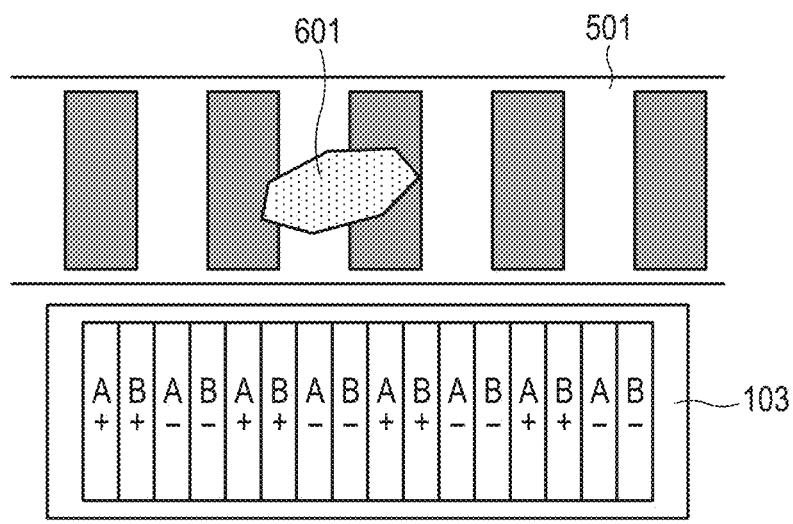
FIG. 7A is a diagram for illustrating an effect of dust on the reflected light and the method of using the light receiver.
Figure 7B:
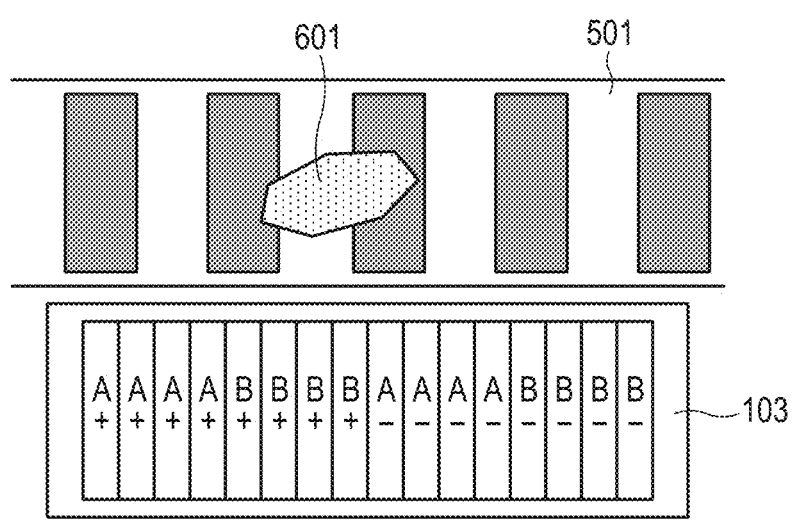
FIG. 7B is a diagram for illustrating the effect of the dust on the reflected light and the method of using the light receiver.

On the other hand, as illustrated in FIG. 7A and FIG. 7B, when dust adheres to the track pattern 201, an effect 601 of dust appears in the reflected light 501. In this case, the voltage signals sig01 to sig16 are expressed as follows.

$$sig01 = a1 \times \sin \theta + s1$$

$$sig02 = a1 \times \cos \theta + s1$$

$$sig03 = a1 \times (-\sin \theta) + s1$$

$$sig04 = a1 \times (-\cos \theta) + s1$$

$$sig05 = a1 \times \sin \theta + s1$$

$$sig06 = a1 \times \cos \theta + s1 + e1$$

$$sig07 = a1 \times (-\sin \theta) + s1 + e2$$

$$sig08 = a1 \times (-\cos \theta) + s1 + e3$$

$sig09 = a1 \times \sin\theta + s1 + e4$ $sig10 = a1 \times \cos\theta + s1 + e5$ $sig11 = a1 \times (-\sin\theta) + s1$ $sig12 = a1 \times (-\cos\theta) + s1$ $sig13 = a1 \times \sin\theta + s1$ $sig14 = a1 \times \cos\theta + s1$ $sig15 = a1 \times (-\sin\theta) + s1$ $sig16 = a1 \times (-\cos\theta) + s1$ In the expressions, e1 to e5 represent effects of the dust on the signals.

Then, the periodic signals A1 and B1 are expressed as follows.

$A1 = a2 \times (sig01 - sig03 + sig05 - sig07 + sig09 - sig11 + sig13 - sig15) + s2 = a2 \times (8 \times a1 \times \sin\theta - e2 + e4) + s2$ $B1 = a2 \times (sig02 - sig04 + sig06 - sig08 + sig10 - sig12 + sig14 - sig16) + s2 = a2 \times (8 \times a1 \times \cos\theta + e1 - e3 + e5) + s2$ In this manner, the effect on the signal due to the dust appears in the periodic signals A1 and B1.

On the other hand, the abnormality detection signals A2 and B2 are expressed as follows.

$A2 = a2 \times (sig01 + sig02 + sig03 + sig04 - sig09 - sig10 - sig11 - sig12) + s2 = a2 \times (-e4 - e5) + s2$ $B2 = a2 \times (sig05 + sig06 + sig07 + sig08 - sig13 - sig14 - sig15 - sig16) + s2 = a2 \times (e1 + e2 + e3) + s2$ In this manner, the effect on the signal due to the dust appears in the signal that is constant with s2 without an abnormality irrespective of the phase θ, which allows the abnormality to be detected by using the abnormality detection signals A2 and B2.

Next, a flow of an operation of the position detector, which includes the signal obtaining conducted by the obtaining unit 107 and the abnormality determination conducted by the abnormality determiner 109, is described.

Figure 8:
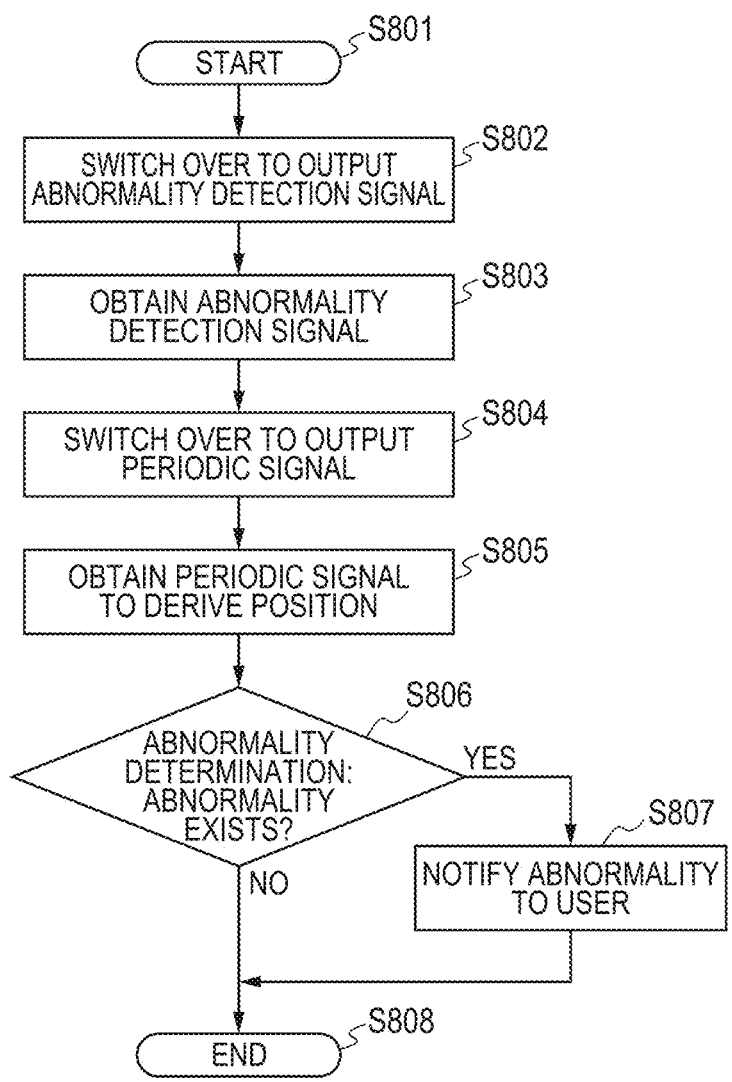
FIG. 8 is a flowchart of an operation of a position detector according to the first embodiment.
Figure 9A:
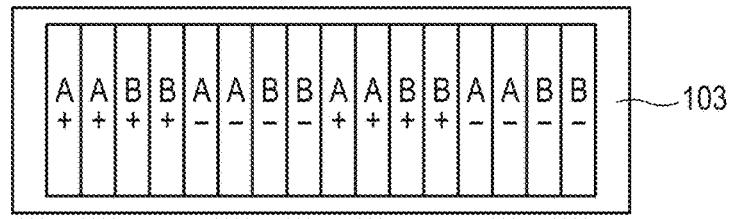
FIG. 9A is a diagram for illustrating a method of using a light receiver, which is a derived form of the first embodiment.
Figure 9B:
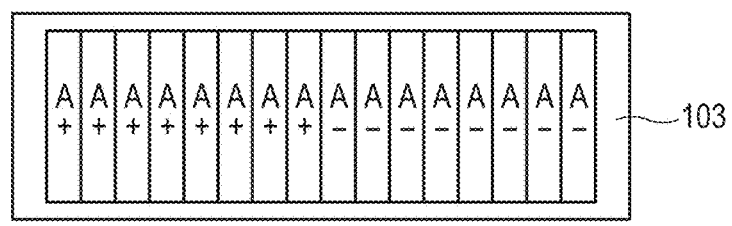
FIG. 9B is a diagram for illustrating a method of using a light receiver, which is a derived form of the first embodiment.
Figure 9C:
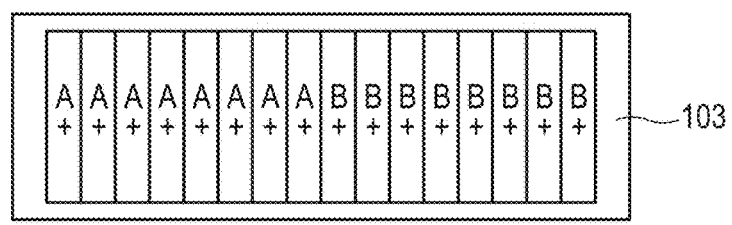
FIG. 9C is a diagram for illustrating a method of using a light receiver, which is a derived form of the first embodiment.
Figure 9D:
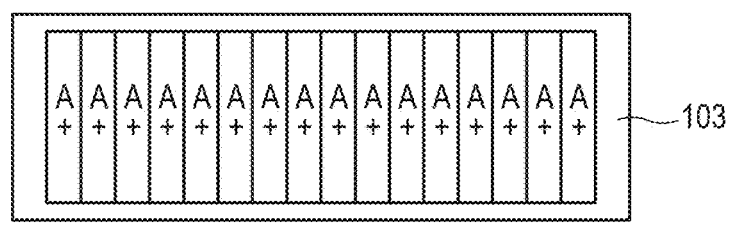
FIG. 9D is a diagram for illustrating a method of using a light receiver, which is a derived form of the first embodiment.

FIG. 8 is a flowchart for illustrating the flow of the operation of the position detector.

In Step S801, processing starts and then proceeds to Step S802.

In Step S802, the obtaining unit 107 sets the switcher 105 so that the output signal to be output from the output unit 106 is switched over to the abnormality detection signal. Then, the processing proceeds to Step S803. Specifically, a signal of 3 V is applied to the switcher 105.

In Step S803, the obtaining unit 107 obtains the abnormality detection signals A2 and B2 from the output unit 106. Then, the processing proceeds to Step S804.

In Step S804, the obtaining unit 107 sets the switcher 105 so that the output signal to be output from the output unit 106 is switched over to the periodic signal. Then, the processing proceeds to Step S805. Specifically, a signal of 0 V is applied to the switcher 105.

In Step S805, the obtaining unit 107 obtains the periodic signals A1 and B1 from the output unit 106, and the position deriver 108 derives the position from the periodic signals A1 and B1. Then, the processing proceeds to Step S806.

In Step S806, the abnormality determiner 109 determines whether or not an abnormality exists in the signal output by the output unit 106 from the abnormality detection signals A2 and B2. When an abnormality exists, the processing proceeds to Step S807, and when an abnormality does not exist, the processing proceeds to Step S808. The abnormality determiner 109 determines that the state is normal when $A2 \approx B2 \approx 1.5$ V, and that an abnormality exists otherwise.

In Step S807, the notifier 110 notifies the abnormality to the user. Then, the processing proceeds to Step S808. Specifically, the LED for abnormality notification is turned on.

Through the above-mentioned processing, the position detector can detect an abnormality in the encoder 10, and notify the abnormality to the user.

As described above, the abnormality detection signals A2 and B2 are generated by the encoder 10, to thereby allow the position detector to detect an abnormality in the encoder 10. Note that, the amplitudes of the abnormality detection signals A2 and B2 are smaller than those of the periodic signals A1 and B1, and hence when the abnormality detection signal is output, a gain may be increased to facilitate the detection of the effect of the dust.

Further, the generation of the abnormality detection signal is not limited to the method according to this embodiment, and as exemplified in FIG. 9A, FIG. 9B, FIG. 9C, and FIG. 9D, the signal that is constant irrespective of the phase θ only needs to be generated.

Second Embodiment

In the following, a position detector according to a second embodiment of the present invention is described with reference to FIG. 10 to FIG. 17.

Figure 10:
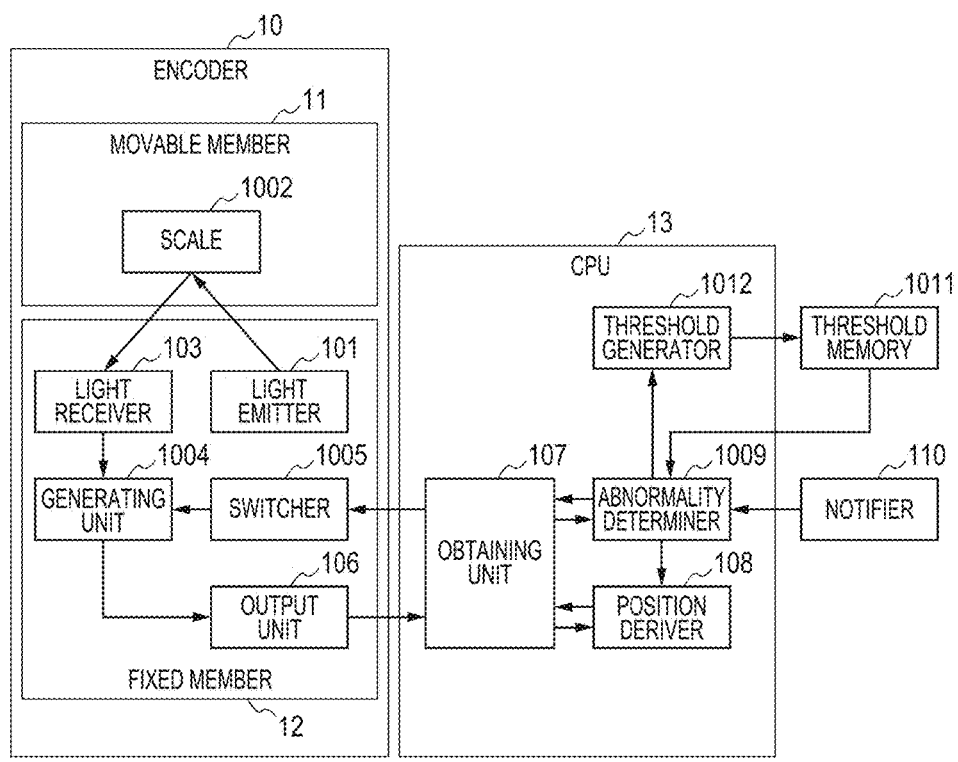
FIG. 10 is a configuration block diagram according to a second embodiment of the present invention.

FIG. 10 is a configuration block diagram of the position detector according to the second embodiment of the present invention. The same components as those of FIG. 1 serving as the configuration block diagram according to the first embodiment are denoted by the same reference numerals, and hence descriptions thereof are omitted.

A scale 1002 has a track pattern that is different from that of the first embodiment and is obtained by multiplexing two kinds of track patterns. The details thereof are described later.

A generating unit 1004 is a signal generating unit configured to generate the abnormality detection signal and two kinds of periodic signals that are generated from two kinds of track patterns multiplexed in the scale 1002 and that correspond to the respective track patterns.

A switcher 1005 is a switcher configured to switch over among a first periodic signal, a second periodic signal, and the abnormality detection signal as a signal to be generated by the generating unit 1004.

Note that, the generation of the periodic signal and the generation of the abnormality detection signal conducted by the generating unit 1004 and the switcher 1005 are described later in detail.

An abnormality determiner 1009 is an abnormality determiner configured to determine whether or not an abnormality exists in the encoder 10 based on the signal obtained by the obtaining unit 107. The abnormality determination conducted by the abnormality determiner 1009 is described later.

A threshold memory 1011 is a memory configured to store a threshold value to be used by the abnormality determiner 1009 to determine that an abnormality exists, and is a non-volatile memory such as an EEPROM.

A threshold generator 1012 is a generator configured to generate the threshold value to be stored in the threshold memory. Details thereof are described later.

Figure 11:
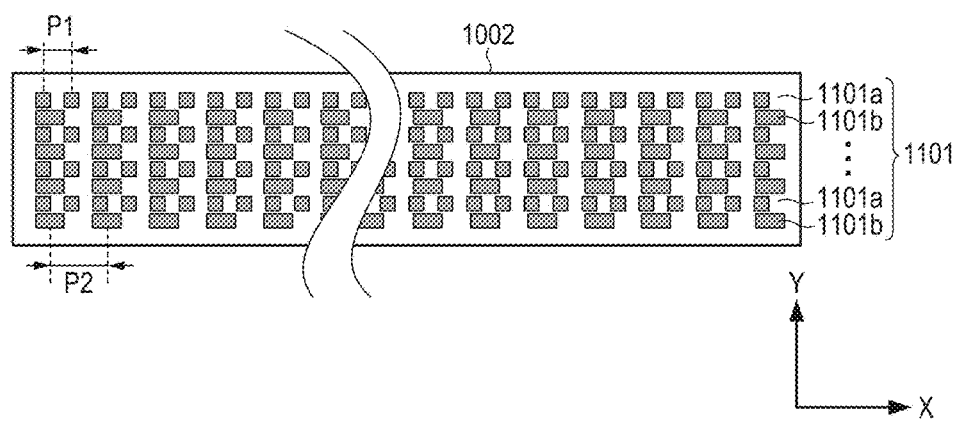
FIG. 11 is a plan view of a scale according to the second embodiment.

Next, the scale 1002 according to this embodiment is described. FIG. 11 is a plan view of the scale 1002. A track pattern 1101 of the scale 1002 is formed of two kinds of track patterns 1101*a* and 1101*b* that are arranged alternately.

Reflective portions of the track pattern 1101*a* are formed at equal pitches P1, and the pitch P1 is determined so that thirty-nine reflective portions are formed over the total length Lmax of the scale, that is, to have thirty-nine cycles over the total length Lmax. On the other hand, the reflective portion of the track pattern 1101*b* are formed at equal pitches P2, and the pitch P2 is determined so that twenty reflective portions are formed over the total length Lmax of the scale, that is, to have twenty cycles over the total length Lmax.

P2 and P1 have the following relationship.

$$P1 = Lmax/39$$

$$P2 = Lmax/20 = (2 \times P1) + a \text{ where } a = -(P1/20)$$

The light receiver 103 converts the reflected light reflected by the track pattern 1101 into the voltage signals sig01 to sig16. At this time, the voltage signal sig01 can be expressed as follows by using the phase θ corresponding to the cycle of the track pattern 1101*a* and a phase φ corresponding to the cycle of the track pattern 1101*b*.

$$sig01 = a1 \times (\sin θ + \sin φ) + s1$$

Then, the voltage signal sig02 can be expressed as follows.

$$sig02 = a1 \times \sin(θ + (1/2 \times P1/(2 \times P1)) \times (2 \times π)) + a1 \times \sin[φ + \{1/2 \times P1/(2 \times P2)\} \times (2 \times π)] + s1 = a1 \times \{\cos θ + \sin(φ + 1/4 \times π + β)\} + s1 \text{ where } β = +1/(39 \times 4) \times π$$

In the expression, β represents a phase shift amount ascribable to the shift of P2 by α from double P1. The phase shift amount β is extremely smaller than a change amount of the phase, and hence for the sake of brevity of description, the description is made on the assumption that β=0.

$$sig02 = a1 \times \{\cos θ + \sin(φ + 1/4 \times π)\} + s1$$

In the same manner, the voltage signals sig03 to sig16 can be expressed as follows.

$$sig03 = a1 \times (-\sin θ + \cos φ) + s1$$

$$sig04 = a1 \times \{-\cos θ + \cos(φ + 1/4 \times π)\} + s1$$

$$sig05 = a1 \times (\sin θ - \sin φ) + s1$$

$$sig06 = a1 \times \{\cos θ - \sin(φ + 1/4 \times π)\} + s1$$

$$sig07 = a1 \times (-\sin θ - \cos φ) + s1$$

$$sig08 = a1 \times \{-\cos θ - \cos(φ + 1/4 \times π)\} + s1$$

$$sig09 = a1 \times (\sin θ + \sin φ) + s1$$

$$sig10 = a1 \times \{\cos θ + \sin(φ + 1/4 \times π)\} + s1$$

$$sig11 = a1 \times (-\sin θ + \cos φ) + s1$$

$$sig12 = a1 \times \{-\cos θ + \cos(φ + 1/4 \times π)\} + s1$$

$$sig13 = a1 \times (\sin θ - \sin φ) + s1$$

$$sig14 = a1 \times \{\cos θ - \sin(φ + 1/4 \times π)\} + s1$$

$$sig15 = a1 \times (-\sin θ - \cos φ) + s1$$

$$sig16 = a1 \times \{-\cos θ - \cos(φ + 1/4 \times π)\} + s1$$

Next, the generation of the periodic signal and the generation of the abnormality detection signal that are conducted by the generating unit 1004 are described.

Figure 12A:
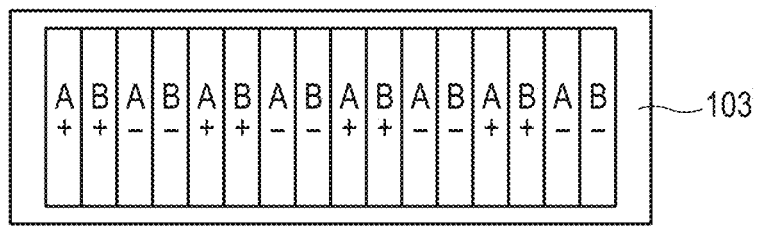
FIG. 12A is a diagram for illustrating a relationship between the reflected light and a method of using a light receiver according to the second embodiment.

When the switchover is made to the generation of the first periodic signal by the switcher 1005, as illustrated in FIG. 12A, the generating unit 1004 generates a first periodic signal A1*a* and a first periodic signal B1*a* from the voltage signals sig01 to sig16 output from the light receiver 103 as expressed by the following expressions.

$$A1a = a2 \times (sig01 - sig03 + sig05 - sig07 + sig09 - sig11 + sig13 - sig15) + s2 = a2 \times (8 \times a1 \times \sin θ) + s2$$

$$B1a = a2 \times (sig02 - sig04 + sig06 - sig08 + sig10 - sig12 + sig14 - sig16) + s2 = a2 \times (8 \times a1 \times \cos θ) + s2$$

Figure 12B:
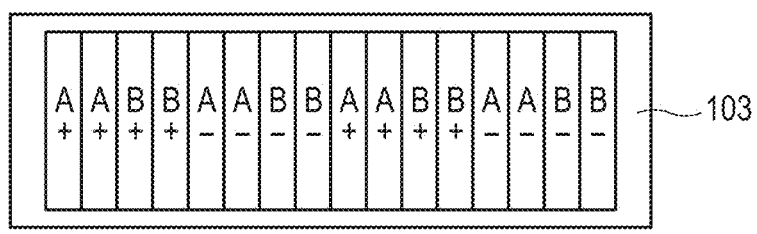
FIG. 12B is a diagram for illustrating a relationship between the reflected light and the method of using the light receiver according to the second embodiment.

Thus, the first periodic signals A1*a* and B1*a* can be generated so that the voltage is amplified for the track pattern 1101*a* and that the voltages cancel each other for the track pattern 1101*b*. In the same manner, when the switchover is made to the generation of the second periodic signal by the switcher 1005, as illustrated in FIG. 12B, the generating unit 1004 generates a second periodic signal A1*b* and a second periodic signal B1*b* from the voltage signals sig01 to sig16 output from the light receiver 103 as expressed by the following expressions.

$$A1b = a2 \times (sig01 + sig02 - sig05 - sig06 + sig09 + sig10 - sig13 - sig14) + s2 = a2 \times [4 \times a1 \times \{\sin φ + \sin(φ + 1/4 \times π)\}] + s2$$

$$B1b = a2 \times (sig03 + sig04 - sig07 - sig08 + sig11 + sig12 - sig15 - sig16) + s2 = a2 \times [4 \times a1 \times \{\cos φ + \cos(φ + 1/4 \times π)\}] + s2$$

Thus, the second periodic signals A1*b* and B1*b* can be generated so that the voltage is amplified for the track pattern 1101*b* and that the voltages cancel each other for the track pattern 1101*a*.

Figure 12C:
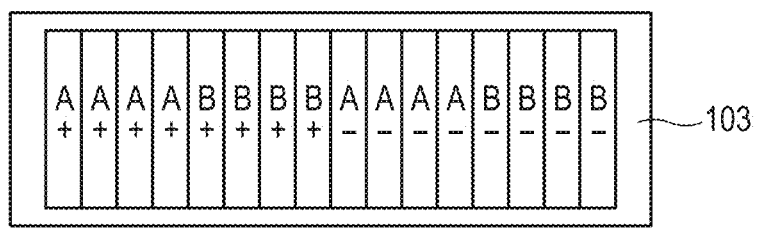
FIG. 12C is a diagram for illustrating a relationship between the reflected light and the method of using the light receiver according to the second embodiment.

Next, the generation of the abnormality detection signal conducted by the generating unit 1004 is described. When the switchover is made to the generation of the abnormality detection signal by the switcher 1005, as illustrated in FIG. 12C, the generating unit 1004 generates the abnormality detection signal A2 and the abnormality detection signal B2 among the voltage signals sig01 to sig16 output from the light receiver 103 as expressed by the following expressions.

$$A2 = a2 \times (sig01 + sig02 + sig03 + sig04 - sig09 - sig10 - sig11 - sig12) + s2 = s2$$

$$B2 = a2 \times (sig05 + sig06 + sig07 + sig08 - sig13 - sig14 - sig15 - sig16) + s2 = s2$$

Thus, the abnormality detection signals A2 and B2 can be generated so that the voltages cancel each other for the track patterns 1101*a* and 1101*b*, and the signal that is constant with s2 irrespective of the phases θ and φ can be generated. When dust adheres to the track pattern 1101, in the same manner as in the first embodiment, the effect on the signal due to the dust appears in the signal that is constant with s2 without an abnormality irrespective of the phases θ and φ, which allows the abnormality to be detected by using the abnormality detection signals A2 and B2.

Figure 13:
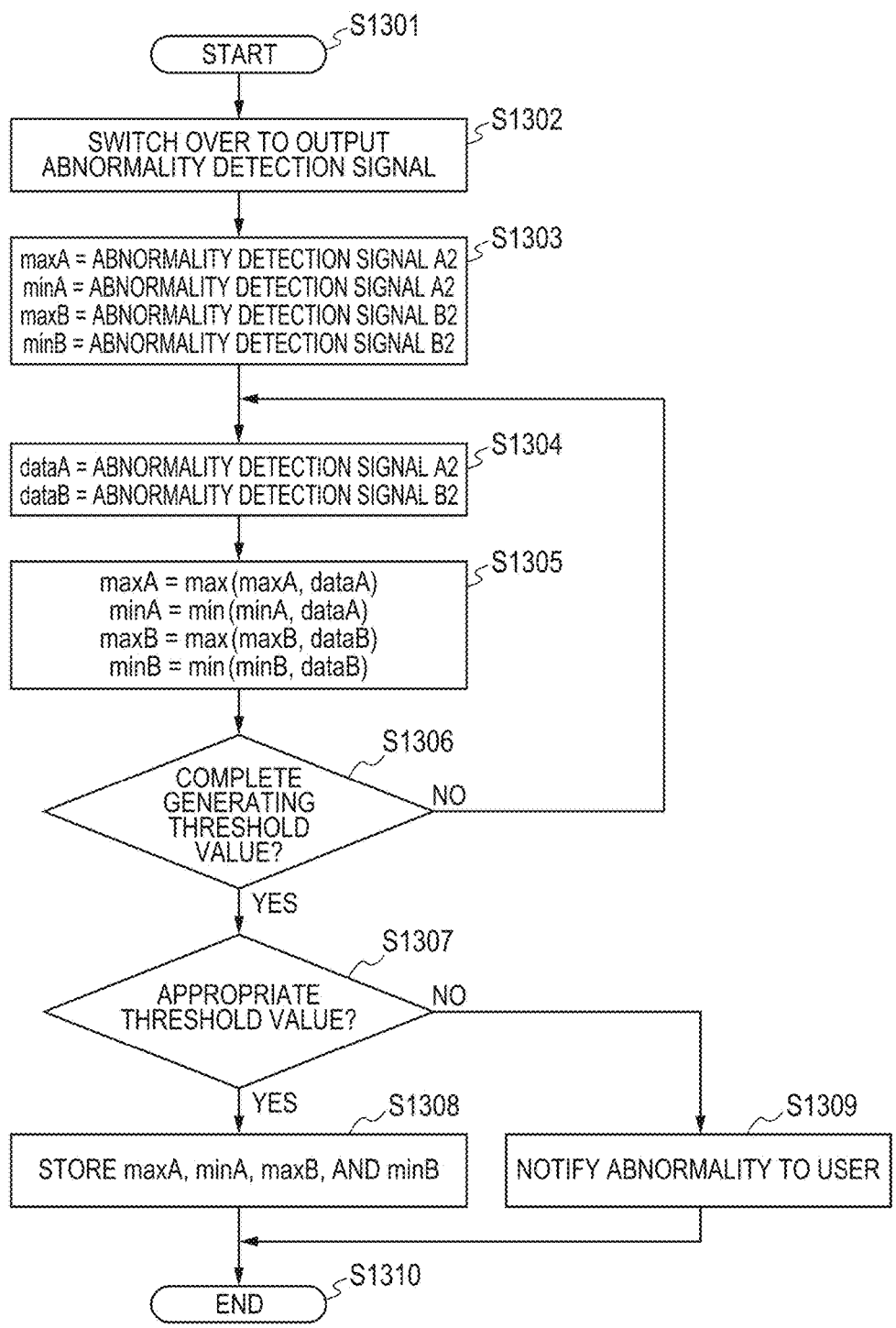
FIG. 13 is a flowchart of threshold value generation for abnormality detection.

Next, threshold value generation conducted by the threshold generator 1012 is described with reference to FIG. 13, FIG. 14A, and FIG. 14B. FIG. 13 is a flowchart for illustrating a flow of an operation of the threshold generator 1012. Note that, processing for the threshold value generation is assumed to be conducted when a product is produced, and is conducted when the threshold value generation is instructed through a switch (not shown) or the like.

In Step S1301, the processing starts and then proceeds to Step S1302.

In Step S1302, the obtaining unit 107 sets the switcher 1005 so that the output signal to be output from the output unit 106 is switched over to the abnormality detection signal. Then, the processing proceeds to Step S1303.

In Step S1303, initial values of threshold values maxA, minA, maxB, and minB are set to the present abnormality detection signals A2 and B2. Then, the processing proceeds to Step S1304.

In Step S1304, the abnormality detection signals are obtained again. Then, the processing proceeds to Step S1305.

In Step S1305, the threshold values maxA, minA, maxB, and minB are compared with the abnormality detection signals A2 and B2, and updated. Then, the processing proceeds to Step S1306.

In Step S1306, it is determined whether or not completion of the generation of the threshold value through the switch (not shown) or the like has been instructed. The processing proceeds to Step S1307 when the completion has been instructed, and returns to Step S1304 otherwise.

In Step S1307, it is determined whether or not the threshold values are appropriate. When the threshold values are appropriate, the processing proceeds to Step S1308, and when the threshold values are not appropriate, the processing proceeds to Step S1309. The determination as to whether or not the threshold values are appropriate is described later.

In Step S1308, the threshold values maxA, minA, maxB, and minB are stored in the non-volatile memory. Then, the processing proceeds to Step S1310.

In Step S1309, the abnormality is notified by the notifier 110. Then, the processing proceeds to Step S1310.

In Step S1310, the processing ends.

Next, the determination as to whether or not threshold value derivation and the threshold values are appropriate is described with reference to FIG. 14A and FIG. 14B. FIG. 14A and FIG. 14B are graphs for showing the abnormality detection signal A2, in which the horizontal axis indicates a relative position of the movable member of the encoder with respect to the fixed member thereof, and the vertical axis indicates the voltage of the signal. Further, a maximum value ampMax is a maximum value that can be taken by the amplitude of the abnormality detection signal A2 in a (normal) state in which there is no abnormality such as dust in design, and when an amplitude ampA of the abnormality detection signal A2 exceeds the maximum value ampMax, it is determined that the threshold value is not appropriate.

Figure 14A:
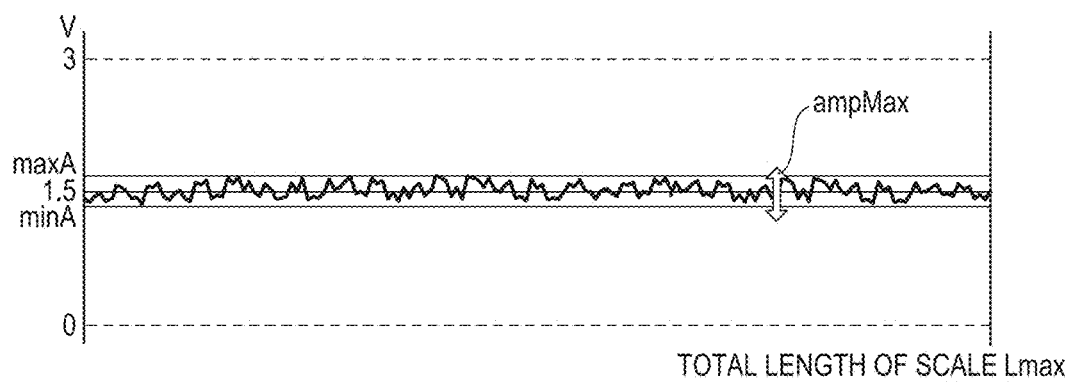
FIG. 14A is a graph for showing an abnormality detection signal for threshold value derivation.

FIG. 14A is a graph for showing the abnormality detection signal A2 in the state in which there is no abnormality such as dust, and as shown in the graph, the threshold values maxA and minA are derived by the threshold generator 1012. In this case, in addition to a signal amount ascribable to the above-mentioned phase shift amount β, a signal noise amount is added to the amplitude ampA=maxA−minA of the abnormality detection signal A2, and the threshold value can be derived by including a variation of the encoder in the production. Further, the maximum value ampMax can be guaranteed in design for the amplitude ampA including the noise amount with ampA<ampMax being satisfied in the state in which there is no abnormality such as dust, and hence it is determined that the threshold value is appropriate.

Figure 14B:
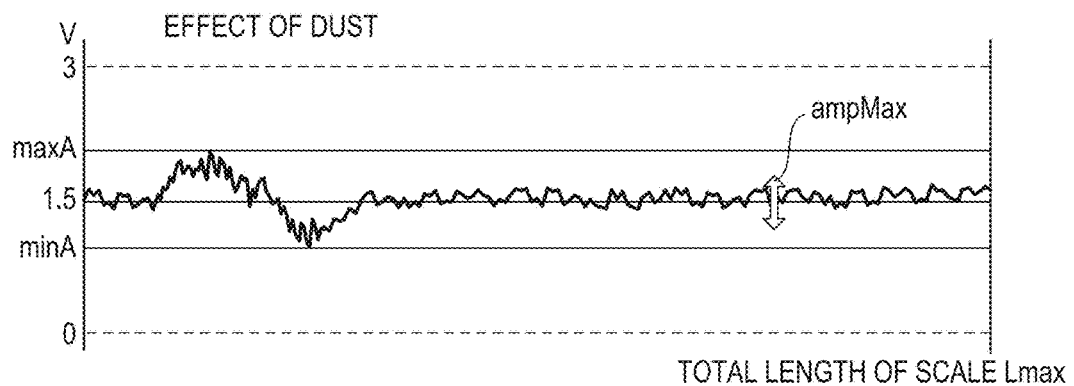
FIG. 14B is a graph for showing the abnormality detection signal for the threshold value derivation.

On the other hand, FIG. 14B is a graph for showing the abnormality detection signal A2 subjected to the effect of an abnormality such as dust, and as shown in the graph, the threshold values maxA and minA are derived by the threshold generator 1012. In this case, the amplitude ampA=maxA−minA of the abnormality detection signal A2 is subjected to the effect of the dust with ampA>ampMax being satisfied, and hence it is determined that the threshold value is not appropriate, which allows an abnormality to be notified.

Accordingly, it is possible to detect and notify an abnormality when the effect of the dust is exerted in threshold value derivation, which allows the threshold value to be derived correctly. Note that, the same applies to the threshold value derivation and the determination of appropriateness of the threshold value for the abnormality detection signal B2.

Figure 15:
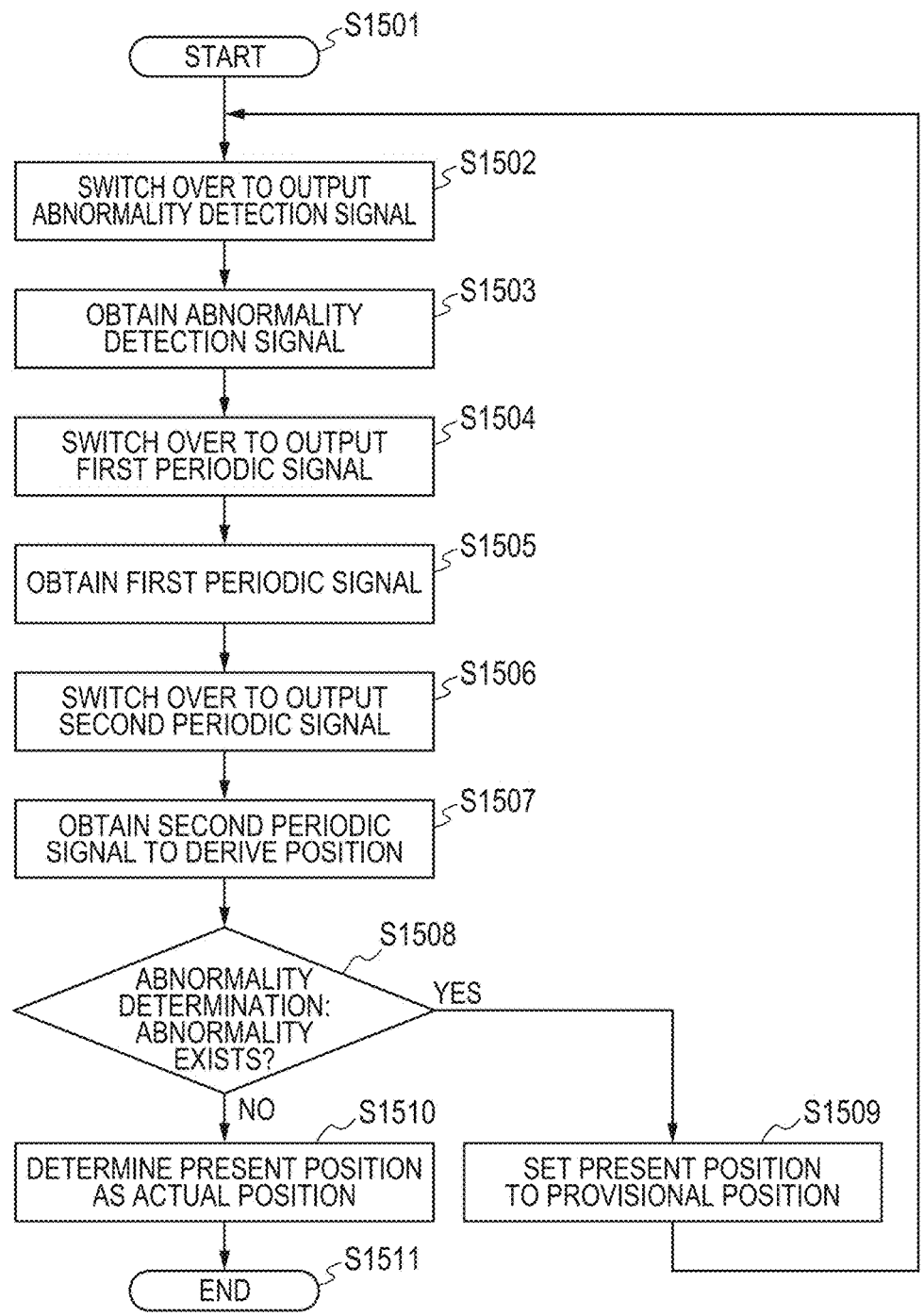
FIG. 15 is a flowchart of an operation of a position detector according to the second embodiment.

Next, a flow of an operation of the position detector, which includes the signal obtaining conducted by the obtaining unit 107 and the abnormality determination conducted by the abnormality determiner 1009, is described. FIG. 15 is a flowchart for illustrating the flow of the operation of the position detector.

In Step S1501, processing starts and then proceeds to Step S1502.

In Step S1502, the obtaining unit 107 sets the switcher 1005 so that the output signal to be output from the output unit 106 is switched over to the abnormality detection signal. Then, the processing proceeds to Step S1503.

In Step S1503, the obtaining unit 107 obtains the abnormality detection signals A2 and B2 from the output unit 106. Then, the processing proceeds to Step S1504.

In Step S1504, the obtaining unit 107 sets the switcher 1005 so that the output signal to be output from the output unit 106 is switched over to the first periodic signal. Then, the processing proceeds to Step S1505.

In Step S1505, the obtaining unit 107 obtains the first periodic signals A1a and B1a from the output unit 106. Then, the processing proceeds to Step S1506.

In Step S1506, the obtaining unit 107 sets the switcher 1005 so that the output signal to be output from the output unit 106 is switched over to the second periodic signal. Then, the processing proceeds to Step S1507.

In Step S1507, the obtaining unit 107 obtains the second periodic signals A1b and B1b from the output unit 106, and the position deriver 108 derives the position from the signals A1a, B1a, A1b, and B1b. Then, the processing proceeds to Step S1508.

In Step S1508, the abnormality determiner 1009 conducts the abnormality determination. When an abnormality exists, the processing proceeds to Step S1509, and when an abnormality does not exist, the processing proceeds to Step S1510. The abnormality determiner 1009 is described later in detail.

In Step S1509, the position derived in Step S1507 is set as a provisional position. Then, the processing returns to Step S1502 in order to derive the position again.

In Step S1510, the position derived in Step S1507 is determined as an actual position. Then, the processing proceeds to Step S1511.

In Step S1511, the processing ends.

Next, the abnormality determination is described with reference to FIG. 16A, FIG. 16B, FIG. 16C, and FIG. 17.

Figure 16A:
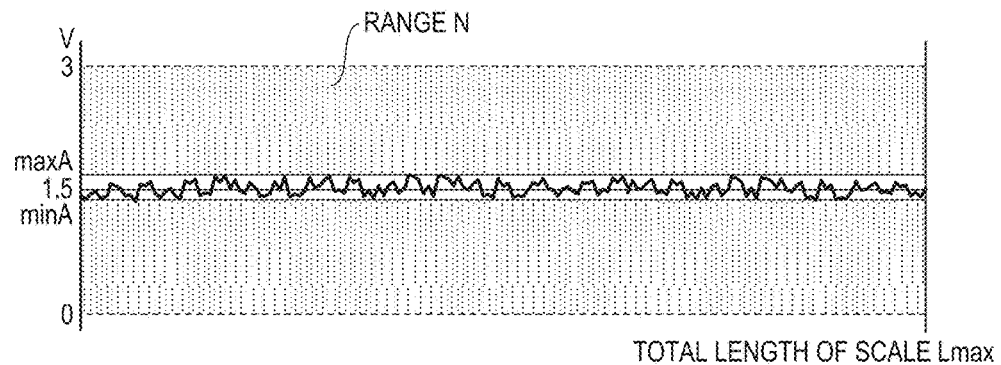
FIG. 16A is a graph for showing the abnormality detection signal for abnormality determination.

FIG. 16A is a graph for showing the abnormality detection signal A2 in the state in which there is no abnormality such as dust. In FIG. 16A, the horizontal axis indicates the relative position of the movable member of the encoder with respect to the fixed member thereof, and the vertical axis indicates the voltage of the signal. Further, the threshold values maxA and minA are derived in the state in which there is no abnormality such as dust as shown in FIG. 14A, and a range N represents a range that falls out of the range of the threshold value, that is, a range in which the signal has a value larger than the threshold value maxA or smaller than the threshold value minA, and a range based on which the abnormality determiner 1009 determines that an abnormality exists. The graph of the abnormality detection signal B2 in the state in which there is no abnormality such as dust is the same as that of the abnormality detection signal A2 shown in FIG. 16A, and is therefore omitted.

Figure 16B:
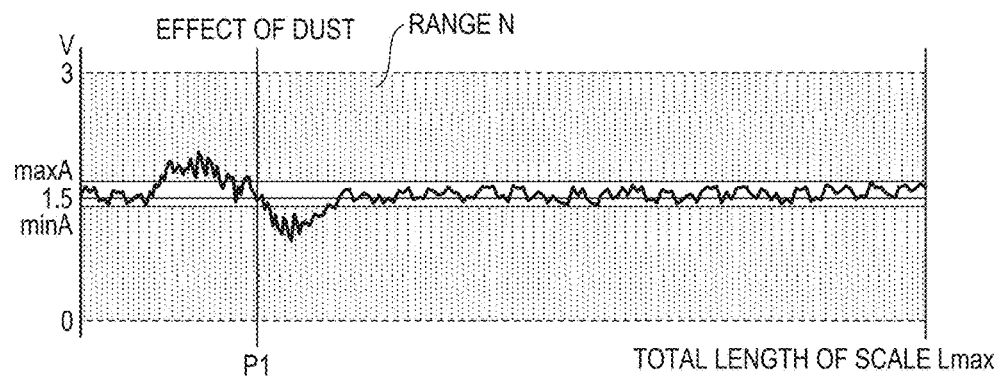
FIG. 16B is a graph for showing the abnormality detection signal for the abnormality determination.
Figure 16C:
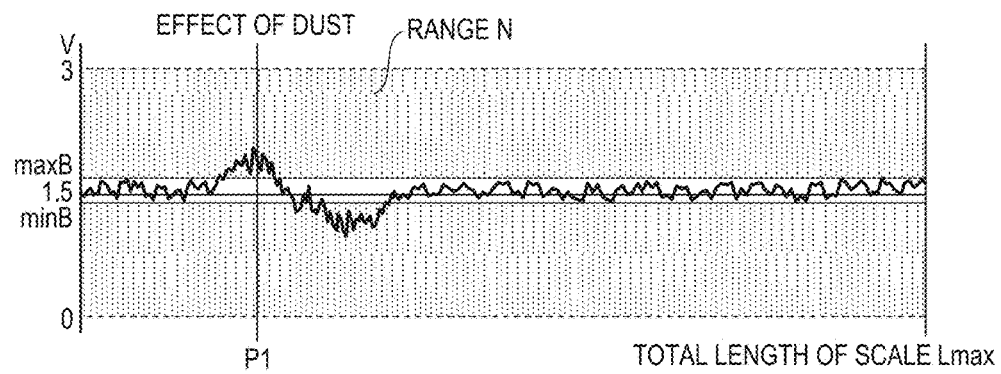
FIG. 16C is a graph for showing the abnormality detection signal for the abnormality determination.

FIG. 16B and FIG. 16C are graphs for showing the abnormality detection signal A2 and the abnormality detection signal B2 in a state in which the effect of the abnormality such as dust is exerted.

In the state in which there is no abnormality such as dust as shown in FIG. 16A, the abnormality detection signal A2 does not fall into the range N, and the abnormality determiner 1009 does not determine that an abnormality exists.

Figure 17:
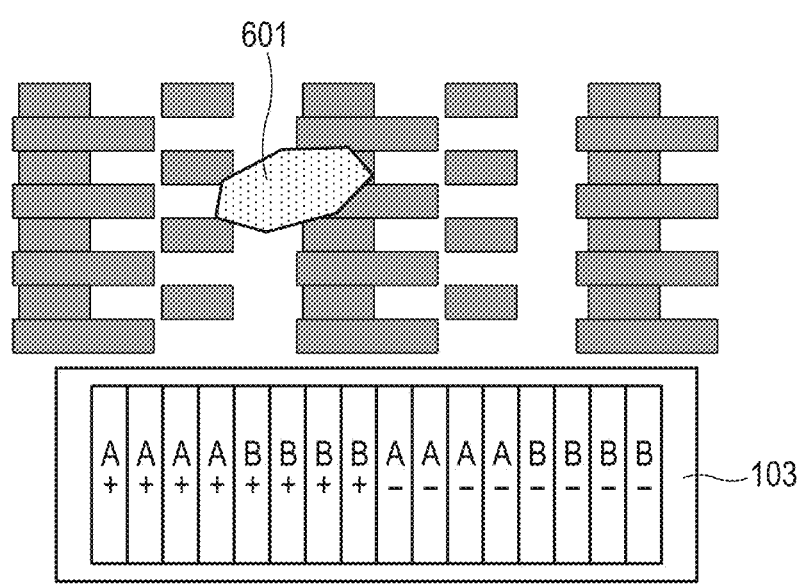
FIG. 17 is a diagram for illustrating an effect of the dust on the reflected light and the method of using the light receiver.

On the other hand, in the state in which the effect of the abnormality such as dust is exerted as shown in FIG. 16B and FIG. 16C, the abnormality detection signals A2 and B2 fall into the range N, and the abnormality determiner 1009 can determine that an abnormality exists. Specifically, for example, when the relative position of the movable member of the encoder with respect to the fixed member thereof is P1, as illustrated in FIG. 17, the effect 601 of the dust or the like occurs in a range of the photodiodes 404 to 409. In that case, as shown in FIG. 16B and FIG. 16C, the effect of the dust does not appear in the abnormality detection signal A2, which is determined to be normal, while the effect of the dust appears in the abnormality detection signal B2, resulting in the determination that the abnormality exists.

In the embodiments described above, the periodic signal is adopted as the first signal that is for detecting the position, and the signal that does not change depending on a relative movement between the scale and the detector is adopted as the second signal that is for the abnormality detection. However the present invention is not limited thereto. A signal having a value that changes within a first range, corresponding to a position of the scale relative to the detector, can be adopted as the first signal, and a signal having a value that does not change or changes in a second range smaller than the first range, corresponding to the position of the scale relative to the detector, can be adopted as the second signal.

As described above, the abnormality detection signals A2 and B2 are generated by the encoder 10, to thereby allow the position detector to detect an abnormality in the encoder 10 even with two kinds of track patterns that are multiplexed. In the same manner, even with the track pattern obtained by multiplexing more patterns instead of two kinds of patterns, it can be determined that an abnormality exists by generating the abnormality detection signal that is constant irrespective of the phase. Note that, this embodiment exemplifies the case where, when it is determined that an abnormality exists, the abnormality is notified to the user and the position is derived again, but the present invention is not limited thereto.

For example, when the position detector includes a drive unit, there may be conducted a method of deriving the position again after driving to another position or a dust removal operation such as conducting drive at high speed, or applying vibrations, sending air toward the scale. Further, although the embodiment of using an optical encoder as an encoder has been described, the present invention is not limited thereto, and a magnetic or electrostatic encoder may be used.

A lens apparatus capable of exhibiting the effect of the present invention can be realized by applying the position detector of the embodiments to a lens apparatus including a movable optical member so as to detect the position of the movable optical member. Further, an image pickup apparatus capable of exhibiting the effect of the present invention can be realized by applying the position detector of the embodiments to an image pickup apparatus including a lens apparatus including a movable optical member and a camera apparatus so as to detect the position of the movable optical member.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-137473, filed Jul. 3, 2014, which is hereby incorporated by reference herein in its entirety.

What is claimed is:
1. A position detector, comprising:
a scale comprising a pattern array formed cyclically, the scale being provided to one of a first member and a second member movable relative to each other;
a detector comprising a plurality of detection elements configured to output signals corresponding to the pattern array, the detector being provided to the other of the first member and the second member;
a generator configured to selectively generate a first signal obtained by a first combination of the output signals and a second signal obtained by a second combination, different from the first combination, of the output signals, wherein
the generator is configured to cause, by the first combination, the first signal to have an amplitude that changes with a first range, the amplitude corresponding to a position of one of the scale and the detector relative to the other; and the generator is configured to cause, by the second combination, the second signal to have, in absence of an abnormality in the detector, an amplitude that does not change or changes with a second range smaller than the first range irrespective of the position of the one of the scale and the detector relative to the other, the second combination subtracting one of the output signals from another, different from the one in phase by 2nπ, of the output signals.

2. The position detector according to claim 1, wherein the first signal comprises a signal having a value that periodically changes with the first range, the value corresponding to the position of the one of the scale and the detector relative to the other.

3. The position detector according to claim 1, wherein the second signal comprises a signal that does not change depending on the position of the one of the scale and the detector relative to the other.

4. The position detector according to claim 1, further comprising a processor configured to determine whether the abnormality exists in the detector based on the generated second signal.

5. The position detector according to claim 4, wherein:
the processor is configured to determine that the abnormality exists in the detector in a case where the generated second signal falls out of a range.

6. The position detector according to claim 4, wherein the processor is configured to notify the abnormality in a case where the processor determines that the abnormality exists in the detector.

7. The position detector according to claim 1, wherein:
the scale comprises a plurality of pattern arrays formed cyclically in mutually different cycles; and
the first signal comprises a plurality of signals corresponding to the plurality of pattern arrays having mutually different cycles corresponding to the position of the one of the scale and the detector relative to the other.

8. The position detector according to claim 1, wherein:
the scale comprises a plurality of reflective pattern arrays formed in mutually different cycles; and
the detector is configured to receive light reflected by the plurality of reflective pattern arrays.

9. The position detector according to claim 1, wherein the generator is configured to generate the first signal by combining signals among signals obtained by the plurality of detection elements so that amplitudes thereof are amplified, and generate the second signal by combining signals among the signals obtained by the plurality of detection elements so that amplitudes thereof are mutually canceled.

10. A lens apparatus, comprising:
a movable optical member; and
a position detector comprising:
a scale comprising a pattern array formed cyclically, the scale being provided to one of a first member and a second member movable relative to each other;
a detector comprising a plurality of detection elements configured to output signals corresponding to the pattern array, the detector being provided to the other of the first member and the second member;
a generator configured to selectively generate a first signal obtained by a first combination of the output signals and a second signal obtained by a second combination, different from the first combination, of the output signals, wherein the generator is configured to cause, by the first combination, the first signal to have an amplitude that changes with a first range, the amplitude corresponding to a position of one of the scale and the detector relative to the other; and the generator is configured to cause, by the second combination, the second signal to have, in absence of an abnormality in the detector, an amplitude that does not change or changes with a second range smaller than the first range irrespective of the position of the one of the scale and the detector relative to the other, the second combination subtracting one of the output signals from another, different from the one in phase by 2nπ, of the output signals, wherein the position detector is configured to detect, as the position of the one of the scale and the detector relative to the other, a position of the movable optical member.

11. An image pickup apparatus, comprising:
a lens apparatus comprising:
a movable optical member; and
a position detector comprising:
a scale comprising a pattern array formed cyclically, the scale being provided to one of a first member and a second member movable relative to each other;
a detector comprising a plurality of detection elements configured to output signals corresponding to the pattern array, the detector being provided to the other of the first member and the second member;
a generator configured to selectively generate a first signal obtained by a first combination of the output signals and a second signal obtained by a second combination, different from the first combination, of the output signals, wherein the generator is configured to cause, by the first combination, the first signal to have an amplitude that changes with a first range, the amplitude corresponding to a position of one of the scale and the detector relative to the other; and the generator is configured to cause, by the second combination, the second signal to have, in absence of an abnormality in the detector, an amplitude that does not change or changes with a second range smaller than the first range irrespective of the position of the one of the scale and the detector relative to the other, the second combination subtracting one of the output signals from another, different from the one in phase by 2π, of the output signals, wherein the position detector is configured to detect, as the position of the one of the scale and the detector relative to the other, a position of the movable optical member; and a camera apparatus.

12. A position detector comprising:
a scale comprising a pattern array formed cyclically, the scale being provided to one of a first member and a second member movable relative to each other, the pattern array including a first pattern array and a second pattern array different from each other in cycle;
a detector comprising a plurality of detection elements configured to output signals corresponding to the pattern array, the detector being provided to the other of the first member and the second member;

a generator configured to selectively generate a first signal obtained by a first combination of the output signals and a second signal obtained by a second combination, different from the first combination, of the output signals, wherein the generator is configured to cause, by the first combination, the first signal to have an amplitude that changes with a first range, the amplitude corresponding to a position of one of the scale and the detector relative to the other; and the generator is configured to cause, by the second combination, the second signal to have, in absence of an abnormality in the detector, an amplitude that does not change or changes with a second range smaller than the first range irrespective of the position of the one of the scale and the detector relative to the other, the second combination causing values to be canceled with respect to both of the first pattern array and the second pattern array to generate the second signal.

13. A lens apparatus comprising:

a movable optical member; and a position detector defined in claim 12, wherein the position detector is configured to detect, as the position of the one of the scale and the detector relative to the other, a position of the movable optical member.

14. An image pickup apparatus comprising:

a lens apparatus defined in claim 13; and a camera apparatus.

* * * * *